Dec. 1, 1964  L. D. HEMPERLY, JR., ET AL  3,159,758

ROTARY MOTOR DRIVEN NONJAMMING LINEAR ACTUATOR

Filed March 27, 1962

L. D. Hemperly, Jr.
R. G. Hoof
  INVENTORS

BY John E. Wagner
  ATTORNEY though if the solenoid type device, the coupling be-# United States Patent Office 3,159,758
Patented Dec. 1, 1964

3,159,758
ROTARY MOTOR DRIVEN NONJAMMING
LINEAR ACTUATOR
Lyle D. Hemperly, Jr., Canoga Park, and Robert G. Hoof, Glendale, Calif., assignors to The Bendix Corporation, North Hollywood, Calif., a corporation of Delaware
Filed Mar. 27, 1962, Ser. No. 182,757
9 Claims. (Cl. 310—83)

This invention relates to electromechanical actuators, and more particularly to rotary electric motor-driven linear actuators.

Actuators employing hydraulic pressure or electrical current inputs to displace an operating armature in a lineal direction find broad utility in the field of control surface movement in aircraft and missiles. The type of actuator used on particular applications depends primarily on the power sources available, the load requirements imposed upon the actuator, and the size and weight limitations to be met. Linear actutaors have generally fallen into three categories, depending upon the required loads under which the actuator must operate. For low loading, e.g., less than 10 pounds maximum force required, and short travel, a simple electrical solenoid type of actuator is sufficient, having an armature displaced upon the passage of current through a surrounding winding. For high loading applications, a preferred choice is a hydraulic actuator employing a cylinder and piston with the piston rod forming the linear moving element. Hydraulic systems generally find use where the load requirements are 50 pounds of force or greater to be supplied by the actuator and a hydraulic fluid source is available.

A third type of actuator commonly serving the intermediate range of 10 to 50 pounds force is the rotating electric motor with a reduction gear connected to a rack or other linear drive mechanism. One particularly desirable form of rotating motor actuator is the type employing an armature shaft which is hollow and internally threaded with the threads engaging the external threads of an output shaft which is restrained from rotation. Upon the operation of the motor, the output shaft is linearly advanced in and out of the motor armature.

One difficulty which has been encountered in the rotating motor type actuator results because the linear moving member is driven through gearing and a threaded connection, and if in normal operation of the motor the linear member is driven against a stop, there is great local stress on the gearing and threads. In many cases the local stress has resulted in jamming of the threads and consequent jamming of the linear moving member. By way of contrast in the solenoid type device, the coupling between the linear armature and the winding is solely through the electro-magnetic field, and an abrupt stopping of the armature results in no undue strain in the mechanical elements of the actuator. Similarly, in the case of hydraulic actuators there are no elements of the actuator which are likely to jam upon reaching the end of an operating stroke.

With this state of the prior art in mind, it is a general object of this invention to provide a nonjamming, rotating-motor linear type actuator.

A more specific object of this invention is to provide a drive system for a rotating-motor linear actuator which removes the load from the motor whenever the actuator reaches the end of its travel.

Another object of the invention is to provide means for automatically or manually re-engaging the motor with the linear member upon reversal of the direction of rotation of the armature.

An understanding of the invention and the accomplishment of these objects may be obtained from the following detailed description and by reference to the drawing, in which.

Figure 1:
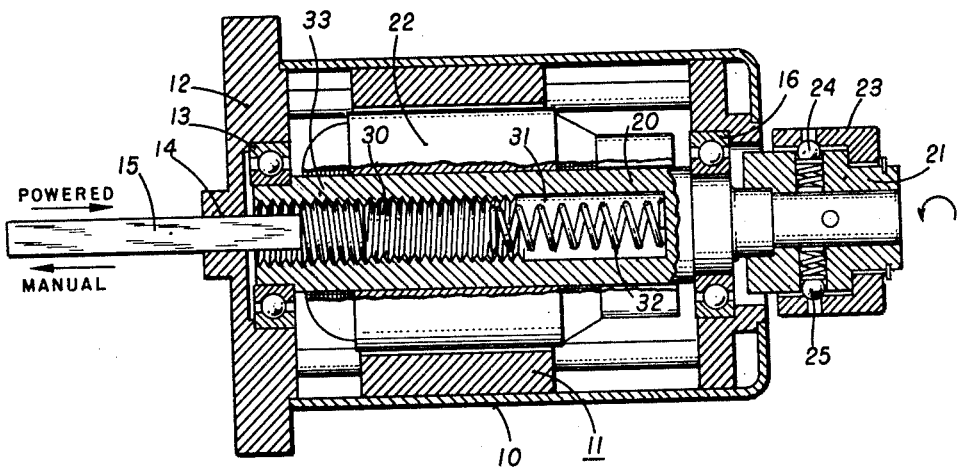
FIG. 1 is a longitudinal section of a linear actuator for powered movement toward the right and manual movement toward the left, in accordance with this invention.

Now referring to FIG. 1, a linear actuator incorporating this invention comprises a housing 10 enclosing a motor assembly 11, having a mounting plate 12 at one end mounting a ball-bearing assembly 13 and having a central opening 14 constituting a guide for an output shaft 15 of the motor. The opening is of noncircular cross-section, conforming to the shape of the output shaft. This may be clearly seen in FIG. 2. A second bearing assembly 16 at the opposite end of motor frame 11 and the bearing 13 journal the armature 22 of the motor.

Extending out of the motor housing 11 through bearing 16 is an extension 21 of the armature shaft 20. The extension carries a knob 23 which engages the armature shaft extension 21 through a ball clutch consisting of balls 24 which are spring-loaded against detents in the inner surface of knob 23 by springs 25. The knob 23 is employed for manual resetting of the actuator as hereinafter described.

The greater length of the armature shaft 20 is hollow and open at the output shaft end. The internal wall of shaft 20 includes a threaded length 30 and a relieved or unthreaded portion 31, the latter at the bottom of the cavity in the shaft 22. A spring 32 at the bottom of the acvity extends from the base of the cavity toward the output shaft end to provide a mechanical bias against the output shaft 15 whenever it is in its innermost position.

The output shaft 15 has a square cross-section extending through the opening 14 and an enlarged screw portion 33 engaging the threads of shaft 22 to be advanced thereby upon rotation of the motor armature 20. The length of the screw portion 33 of shaft 15 is less than that of the unthreaded length 31 of the armature cavity so that the output shaft 15 may become operatively disengaged from the armature shaft whenever the armature 20 has completed a sufficient number of turns to retract the shaft 15. In a typical application, shaft movement of one-half inch is required. This is accomplished by approximately twelve turns of the armature.

In FIG. 1 the output shaft 15 is shown in a partially extended position with the screw portion fully engaging the internal threads of the armature shaft 20. Output shaft 15 is restrained from rotation by contact with the walls of opening 14 in plate 12. Consequently upon rotation of the armature 20 in the direction of the arrow in the drawing, the shaft is retracted until the screw portion 33 is translated beyond the end of the threaded portion 30 of the armature shaft and into the enlarged recess 31. The output shaft 15, in retracting, compresses the spring 32 which serves to maintain the shaft 15 in position for entering engagement with the threads of the armature shaft 22 upon reversal of rotation.

The actuator of FIG. 1 is intended for one-time powered operation to be followed by manual resetting, using the knob 23. This is accomplished merely by turning the knob 23 in the direction opposite to the powered rotation of armature 20 and knob 23. The ball clutch prevents jamming of the shaft 15 against the plate 12 by excessive force applied to the knob 23.

Figure 3:
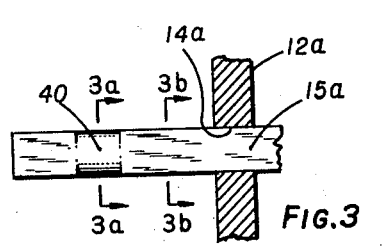
FIG. 3 is a fragmentary view, partly in section, of the output shaft portion of an alternate embodiment of the invention.
Figure 2:
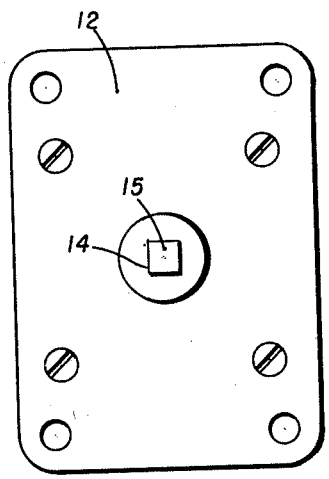
FIG. 2 is an output end view of the actuator of FIG. 1.
Figure 4:
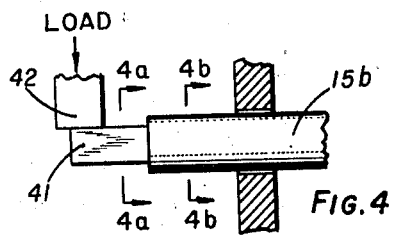
FIG. 4 is a fragmentary sectional view similar to FIG. 3 of a second alternative embodiment.
Figure 4A:
FIGS. 4a and 4b are transverse sectional views of the embodiment of FIG. 4.
Figure 4B:

For the successful operation of the actuator of this invention, the output shaft is restrained from rotation at least during its operating movement. In the device of FIGS. 1 and 2, shaft 15 is restrained at all times from rotation by its noncircular shape and conforming shape of opening in the plate 12. In the embodiments of FIGS. 3 and 4 the same operational advantage of jam-proof operation is accomplished, but in two different ways.

Figure 3A:
FIGS. 3a and 3b are transverse sectional views of the output shaft of FIG. 3.
Figure 3B:

In FIG. 3 the output shaft 15a is of noncircular cross-section in the region which passes through the conforming opening 14a of plate 12a. The noncircular shape as shown in FIG. 3b is square in a preferred case. The shaft 15a includes, however, a section 40 of either circular cross-section as indicated in FIG. 3a or reduced dimensions such that it will turn freely with the armature (unshown in FIG. 3) whenever the section 40 coincides with the opening 14a in wall 12a. Then the shaft 15a will turn freely with the armature, and no further translation will occur.

In the embodiment of FIG. 4 the output shaft 15b is of circular cross-section and consequently is not restrained from rotation by the plate 12b. Instead the end section 41 is noncircular and bears against the load, in this case a plunger 42, which is normally spring-biased in the direction of the arrow to be relieved upon the retraction of shaft 15b. Significantly the shaft 15b, upon release of load 42, is then free to rotate with the armature (unshown in FIG. 4) and thereby free from jamming.

In the embodiment of FIGS. 3 and 4, protection from jamming at the end of the operate stroke is accomplished by having the output shaft turn freely with the armature. Although this arrangement is satisfactory, the embodiment of FIG. 1 is preferred for the reason that repositioning or resetting is more easily accomplished. This is done without any necessity for aligning the output shaft with the opening 14 as in the case of FIG. 3 or with the load 42 as in the case of FIG. 4. In most installations the output shaft end of the actuator is not readily accessible for alignment.

In summary, actuators incorporating this invention insure against jamming of the linear moving element by automatically disconnecting the output shaft either from the motor armature or the load (FIG. 4) without impact with any stop or without the necessity of de-energizing the motor instantaneously. The mechanical arrangement for achieving this operational advantage requires no additional elements to a rotary-motor linear actuator or increase in size or weight over a conventional rotary-motor linear actuator. With the presence of this antijamming feature, the rotary-motor actuator becomes a ready replacement for linear solenoids, offering the advantages of constant operating force and longer stroke.

Although for the purpose of explaining the invention a particular embodiment thereof has been shown and described, other modifications within the spirit and scope of this invention will occur to persons skilled in the art. The scope of this invention is only limited by the appended claims.

We claim:
1. A nonjamming linear actuator comprising:
    a rotary motor including an armature,
    the shaft of said armature comprising a tubular member having an internally threaded length, an output shaft including a threaded section engaging the threaded length of said armature shaft and a length of noncircular cross-section, which length extends out of one end of said motor, and
    means bearing against the noncircular length of said output shaft to restrain said output shaft from rotation with said armature whereby the output shaft is translated upon rotation of the armature, and
    means responsive to the displacement of said output shaft for interrupting the driving connection between said armature and the load controlled by said output shaft.

2. A nonjamming actuator comprising:
    a motor,
    the armature of said motor including a tubular shaft having an internally threaded length,
    an output shaft including a threaded portion engaging the threads of said armature shaft, and
    a noncircular cross-section portion extending out of one end of said motor, and
    means cooperating with the noncircular portion for restraining said output shaft from rotation when extended out of said motor to one extent, said means releasing the output shaft for rotation with the armature and motor when extending out of the motor to a different extent.

3. The combination in accordance with claim 2 wherein said means restraining the output shaft from rotation constitutes the frame of the motor.

4. The combination in accordance with claim 2 wherein the means restraining the output shaft from rotation constitutes the load controlled by said output shaft.

5. A nonjamming linear actuator comprising:
    a rotary electric motor having an armature shaft,
    the shaft of said armature comprising a hollow or tubular member having an internal threaded length and an unthreaded cavity aligned therewith,
    said cavity being longer and of greater transverse dimension than said threaded portion whereby the output shaft at one extreme direction of travel is completely disengaged from the internal threads of the armature whereupon the armature may turn freely without further movement of the output shaft,
    an output shaft including threads engaging the threads of said tubular shaft member and having a length extending out of the motor and constituting the actuator operating member, and
    means restraining said output shaft from rotation whereby the output shaft is translated upon the rotation of said armature until the threads of the output shaft enter the cavity of the armature shaft.

6. The combination in accordance with claim 5 wherein said cavity includes spring means for urging the output shaft in the direction of the threaded portion of the armature shaft for immediate re-engagement of the output shaft with the armature upon a reversal of direction of rotation of the armature.

7. A nonjamming linear actuator comprising:
    a rotary electric motor having an armature and shaft,
    the shaft of said armature having a recess extending along the axis of rotation of the armature from one end of the motor,
    the recess of the armature including a threaded section at one end thereof and a cavity section of greater transverse dimension than the threaded section in the opposite end thereof,
    an output shaft including a threaded section engaging the threads of said armature shaft and a noncircular cross-section portion extending out of the open end of the armature shaft, and
    guide means rigidly mounted with respect to the stator of said motor including an opening conforming in shape to the noncircular portion of the output shaft and bearing thereagainst to restrain the output shaft from rotation whereby the output shaft is translated upon rotation of the armature to a point where the threaded portion of the output shaft enters the enlarged cavity portion of the armature shaft whereupon the output shaft is disengaged from the threads of the armature shaft.

8. A nonjamming linear actuator comprising:
    a rotary electric motor including an armature,
    the shaft of said armature including an axial threaded recess extending from one end thereof, an output shaft including a threaded portion engaging the threads of said armature shaft, said output shaft including a second section of noncircular cross-section extending out of the end of said armature shaft, means rigidly connected to the stator portion of the motor and bearing against the noncircular portion of the output shaft to restrain the output shaft from rotation, said output shaft including a portion of reduced size longitudinally displaced from the noncircular portion of the output shaft whereby the output shaft is not restrained from rotation whenever the longitudinal displacement of the output shaft allows the reduced portion thereof to coincide with the rotation-restraining means, and the output shaft is thereby allowed to rotate freely with the armature without further translation.

9. The combination in accordance with claim 8 wherein said reduced section of the output shaft is of circular cross-section.

References Cited in the file of this patent

UNITED STATES PATENTS

| | | |
|---|---|---|
| 2,218,605 | Down | Oct. 22, 1940 |
| 2,366,739 | McCoy | Jan. 9, 1945 |
| 2,446,393 | Russell | Aug. 3, 1948 |
| 2,978,621 | Mortinek | Apr. 4, 1961 |